(12) United States Patent
Bitner et al.

(10) Patent No.: US 6,368,390 B1
(45) Date of Patent: Apr. 9, 2002

(54) AUTOMATIC FILTER ROTATING DEVICE

(75) Inventors: Glenn W. Bitner, Alsip; Timothy J. Yurczak, Jolier, both of IL (US)

(73) Assignee: Venturedyne, Ltd., Milwaukee, WI (US)

( * ) Notice: Subject to any disclaimer, the term of this patent is extended or adjusted under 35 U.S.C. 154(b) by 0 days.

(21) Appl. No.: 09/597,341

(22) Filed: Jun. 19, 2000

(51) Int. Cl.$^7$ .............................................. B01D 46/04
(52) U.S. Cl. .............................. 95/277; 55/302; 55/404; 55/405
(58) Field of Search ................. 95/277, 288; 55/293, 55/302, 404, 405, 400, 484, 341.1

(56) References Cited

U.S. PATENT DOCUMENTS

| | | | |
|---|---|---|---|
| 2,788,860 A | * | 4/1957 | Turner |
| 3,060,663 A | * | 10/1962 | Morris et al. |
| 3,107,987 A | * | 10/1963 | Duer |
| 3,116,990 A | * | 1/1964 | Duer |
| 3,273,324 A | * | 9/1966 | Jennings |
| 3,286,389 A | | 11/1966 | Sylvan ........................ 123/119 |
| 3,289,397 A | * | 12/1966 | Schonewald et al. |
| 3,667,195 A | | 6/1972 | Angilly ........................ 55/272 |
| 3,792,569 A | | 2/1974 | Carlson ........................ 55/228 |
| 3,898,066 A | | 8/1975 | Miskiewicz ................... 55/317 |
| 4,038,058 A | * | 7/1977 | Miskiewicz |
| 4,130,404 A | * | 12/1978 | Berghdal |
| 4,199,334 A | | 4/1980 | Berkhoel ..................... 55/304 |
| 4,204,846 A | | 5/1980 | Brenholt ...................... 55/272 |
| 4,222,755 A | | 9/1980 | Grotto ......................... 55/291 |
| 4,297,114 A | | 10/1981 | Hutchins ...................... 55/299 |
| 4,340,401 A | | 7/1982 | van Weelden ............... 55/305 |
| 4,452,616 A | * | 6/1984 | Gillingham et al. |
| 4,504,293 A | * | 3/1985 | Gillingham et al. |
| 4,579,570 A | | 4/1986 | Klaas ........................... 55/305 |
| 4,661,129 A | | 4/1987 | Nederman .................... 55/218 |
| 5,062,872 A | * | 11/1991 | Williams |
| 5,713,972 A | * | 2/1998 | Snyder, Sr. |
| 5,803,954 A | * | 9/1998 | Gunter et al. |
| 6,146,433 A | * | 11/2000 | Bitner |
| 6,214,077 B1 | * | 4/2001 | Bitner |

* cited by examiner

Primary Examiner—Duane S. Smith
(74) Attorney, Agent, or Firm—Jansson, Shupe & Munger, Ltd.

(57) ABSTRACT

An improved dust collector having a housing that encloses clean-air and dirty-air chambers with an elongate non-vertical annular hollow filter with an end accommodating the flow of clean air positioned in the housing, and a nozzle connected to an air source where the nozzle is positioned so as to inject a blast of air into the filter in order to dislodge particulate accumulated on the outside of the filter. The improvement involves a turbine positioned within the filter and linkage joining the turbine with respect to the filter such that a blast of air from the nozzle turns the turbine which thereby turns the filter whereby the filter is reoriented to facilitate removal of particulate collected thereon.

15 Claims, 6 Drawing Sheets

AUTOMATIC FILTER ROTATING DEVICE

FIELD OF THE INVENTION

This invention relates generally to an air filtering device, and in particular to a device for cleaning an air filter in the dirty-air chamber of an industrial dust collector.

BACKGROUND OF THE INVENTION

Dust collectors are used to filter particulate out of air that is drawn from various sources including fume and ventilation hoods used in industrial applications such as welding and chemical and pharmaceutical processing.

Currently, air filters located within a dirty-air chamber of a dust collector are cleaned by injecting the filters with a blast of air. This air blast dislodges dust and particulate matter that has accumulated on the filter by impacting the sides of the filter or by creating a pressure differential within the filter such that the air pressure inside the filter is greater than the pressure outside. This pressure differential causes the air within the filter to expand outward thereby blowing the dust off of the outside of the filter.

While the injection of air is a useful way to clean the filter, such a cleaning is more effective when the air filters are oriented in a vertical direction as opposed to a horizontal or non-vertical direction. This is because filters oriented horizontally tend to accumulate the majority of the particulate matter on the surface nearest the top of the filter. As such, when these filters are changed—due to the concentration of dust and particulate on the top third of the filter—the bottom two-thirds of the filter are relatively clean.

In addition to air cleaning, filters are cleaned by shaking mechanisms such as those disclosed in U.S. Pat. No. 4,579,570 (Klaas), U.S. Pat. No. 4,340,401 (van Weelden et al.) and U.S. Pat. No. 4,199,334 (Berkhoel). These shaking mechanisms employ mechanical devices such as rods or plates to shake the filters in order to loosen dust accumulated thereon.

Other means of cleaning filters involve rotating the filter through the use of an electric motor. Such a method is disclosed in U.S. Pat. No. 4,222,755 (Grotto) and U.S. Pat. No. 4,661,129 (Nederman). Because of the motor output required to rotate a filter, such devices are useful only for small filters such as those found in internal combustion engines.

The rotation of a filter through the use of a turbine is disclosed in U.S. Pat. No. 3,898,066 (Miskiewicz). In Miskiewicz, turbine blades which are attached to a cover plate extend beyond the filter which is located in a housing. Such turbine blades are coupled via the cover plate to the filter thereby allowing the blades to rotate the filter. Although Miskiewicz employs a turbine, such turbine is located outside of the filter. Thus, any air used to turn the turbine cannot be used to clean the filter by way of injection into the filter. This results in an inefficient use of the air.

Devices that allow for the filter to be rotated at some regular interval allow for a more even distribution of the dust and particulate over the filter thereby increasing the operational life of such filter. This helps to reduce operating costs associated with the operation of the dust collector as the filters have to be replaced less frequently. A device that rotates cleaning filters used in a dust collector so as to allow for a more even distribution of dust and particulate on the filter would be an important improvement in the art.

OBJECTS OF THE INVENTION

An object of the invention is to provide an improved dust collector that overcomes some of the problems and shortcomings of the prior art.

Another object of the invention is to provide an improved dust collector that extends the useful life of an air filter.

How these and other objects are accomplished will become apparent from the following descriptions and from the drawings.

SUMMARY OF THE INVENTION

This invention involves an improvement to a dust collector for removing particulate from air. The dust collector includes a housing that encloses clean-air and dirty-air chambers. An elongate non-vertical annular hollow filter with an end accommodating the flow of clean air is positioned in the housing. A nozzle connected to an air source is positioned so as to inject a blast of air into the filter in order to dislodge particulate accumulated on the outside of the filter.

The improvement comprises a turbine positioned within the filter and linkage joining the turbine with respect to the filter such that a blast of air from the nozzle turns the turbine which thereby turns the filter so that the filter is reoriented to facilitate removal of particulate collected thereon.

In one embodiment of the invention, the linkage is comprised of a turbine shaft positioned within the filter and connected to the turbine. A drive cover is attached to an end of the filter opposite the flow end and a drive plate connects the shaft to the drive cover. In a specific version of such embodiment, a coupling extends from a turbine and a gear train is connected intermediate the coupling and the turbine shaft. In a more specific version of the embodiment, reduction gearing is used to facilitate rotation of the shaft. Such reduction gearing can include a first spur gear attached to the coupling, a second spur gear interacting with the first spur gear, a jack shaft connecting the second spur gear to a third spur gear and a fourth spur gear connected to the turbine shaft and interacting with the third spur gear.

In another embodiment of the invention, a plurality of air bearings connect the end of the filter accommodating flow to a wall. Each of the air bearings is comprised of an air-bearing port on the side of the wall outside of the dirty-air chamber, a slotted ring between the wall and the filter and a sealing element attached to the first end of the filter. In a specific version of this embodiment, a plurality of auxiliary air lines are attached to the air source in such a manner that they surround the nozzle, at least one of the auxiliary air lines is routed to a manifold which then directs the air to the air-bearing ports. In another version of such embodiment, the remaining auxiliary air lines are oriented so as to direct air flow toward the outer edge of the turbine.

In still another embodiment of the invention, the filter is positioned on a support frame located within the housing.

In a preferred embodiment of the invention, the housing of the dust collector includes a door wall defining a passageway, an outer door engaged with the door wall to substantially seal the passageway and a spring assembly connecting the door to the drive cover. In such an embodiment, the spring assembly includes a first set of guide pins having proximal and distal ends. The proximal ends of the pins are attached to a stop plate while the distal ends are connected to the door. A compression spring is positioned between the door and a spring backing plate within the first set of guide pins. A second set of guide pins are attached to the drive cover and extend through the stop plate and the spring backing plate into the dirty-air chamber. Such guide pins have proximal and distal ends with a retainer at the distal end and at least one of the pins extending through the drive cover and being affixed at its proximal end to the drive plate, whereby torque is transferred from the turbine shaft and the drive plate to the drive cover.

In still another embodiment of the invention, at least two filters are positioned in the housing. These filters are oriented end-to-end and a sealing element seals the two filters together.

The invention also involves a method for cleaning a filter located in a dust collector. Such method is comprised of the steps of: (a) positioning a turbine within the filter; (b) linking the turbine to the filter; (c) impacting the turbine with a blast of air thereby causing the turbine to rotate; and (d) imparting the rotation of the turbine to the filter by means of the linkage, whereby the rotation causes the particulate accumulated on the filter to fall into the collector.

In one preferred embodiment of the method, the blast of air is generated through a nozzle. In a more specific version of such embodiment, the air blast is generated through a nozzle in combination with a plurality of air lines.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE INVENTION

Figure 1:
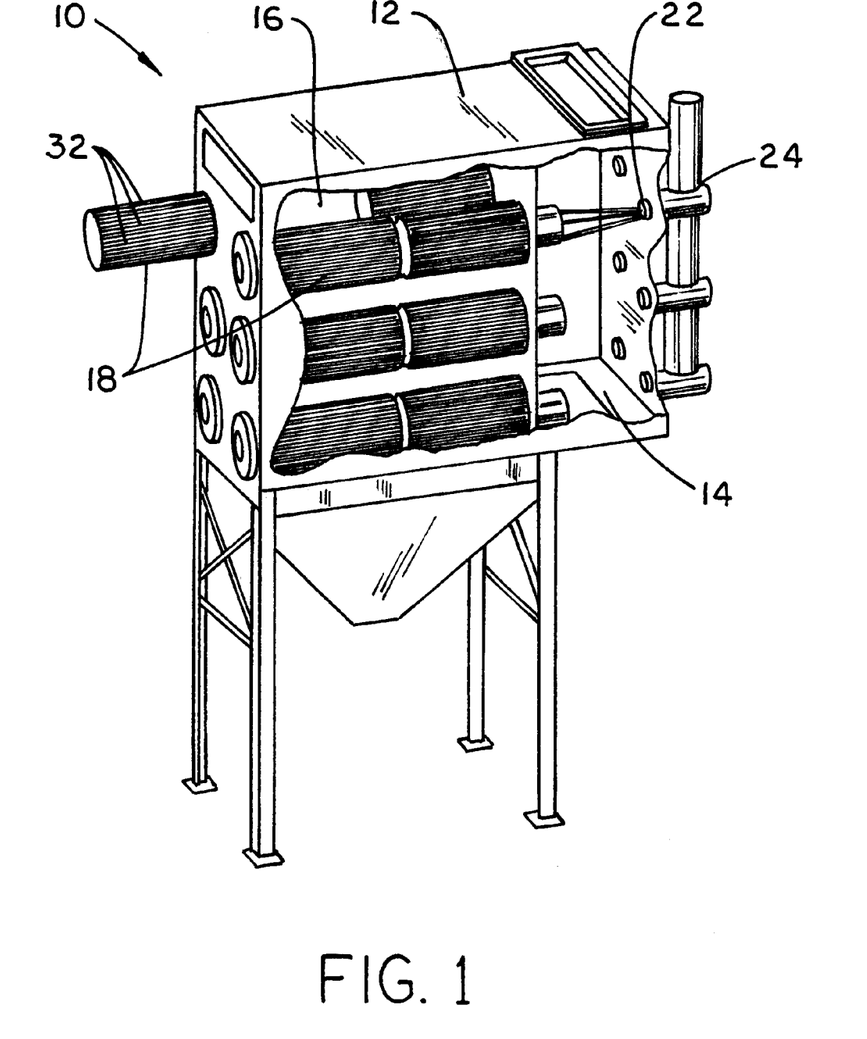
FIG. 1 is a perspective view of a dust collector including a cut-away portion showing two filters positioned within the dirty-air chamber.

This invention involves an improvement to a dust collector 10 for removing particulate from air. The dust collector 10, as shown in FIG. 1, includes a housing 12 that encloses clean-air and dirty-air chambers 14, 16. An elongate non-vertical annular hollow filter 18 with an end accommodating the flow of clean air is positioned in the housing 12, and a nozzle 22 attached to an air source 24 is positioned so as to inject a blast of air into the filter 18 in order to dislodge particulate accumulated on the outside of the filter 18. More than one filter 18 may be provided as shown in FIG. 1.

Figure 2:
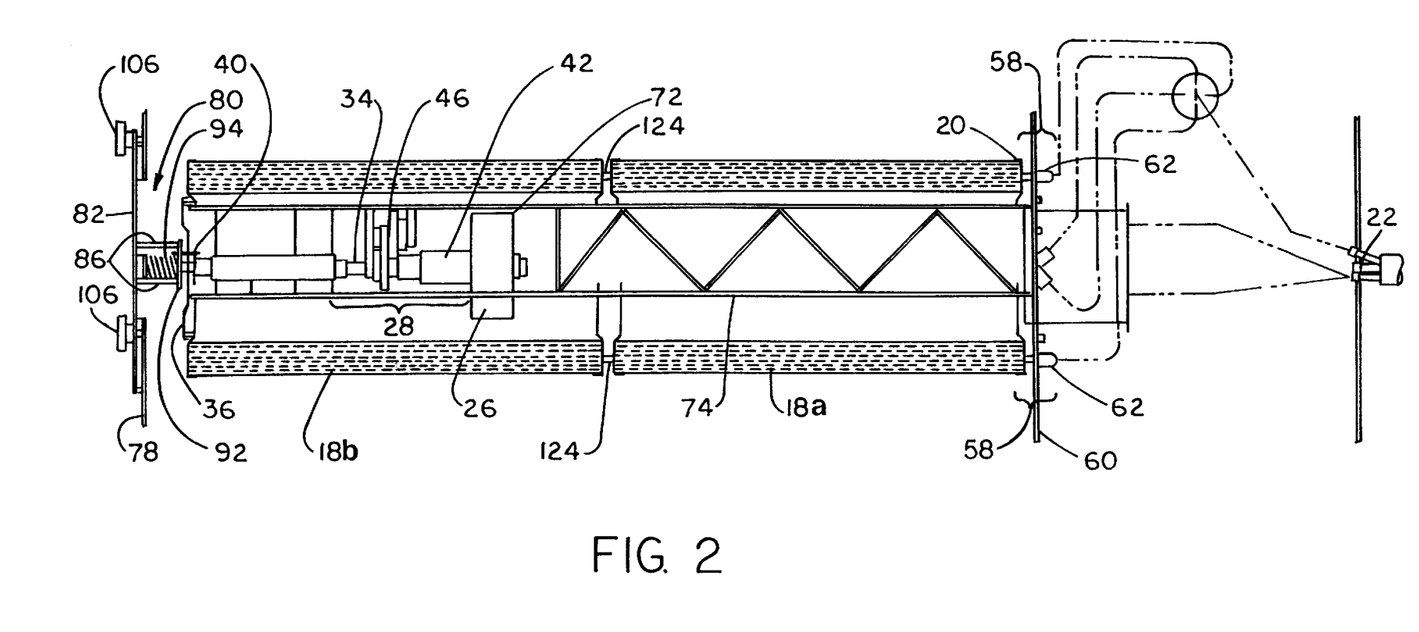
FIG. 2 is a sectional view of two filters positioned in the dust collector showing the turbine, drive linkage and support cage.

FIG. 2, shows one embodiment of the improvement which comprises a turbine 26 positioned within the filter 18 and linkage 28 joining the turbine 26 with respect to the filter 18 such that a blast of air from the nozzle 22 turns the turbine 26 which thereby turns the filter 18 whereby the filter 18 is reoriented to facilitate removal of particulate collected thereon.

The general concept of the invention is to rotate the non-vertical filter 18 incrementally during the activation of the air source 24 and cleaning cycle so that the dust on the top pleats 32 of the filter media 18 is eventually emptied when the top pleats 32 have rotated to the bottom (i.e., filter 18 is rotated 180°). This rotational indexing of the filter 18 will assist in emptying the top dust filled pleats 32 and allow the complete filter 18 to be usable for filtering dust from the air.

Figure 3:
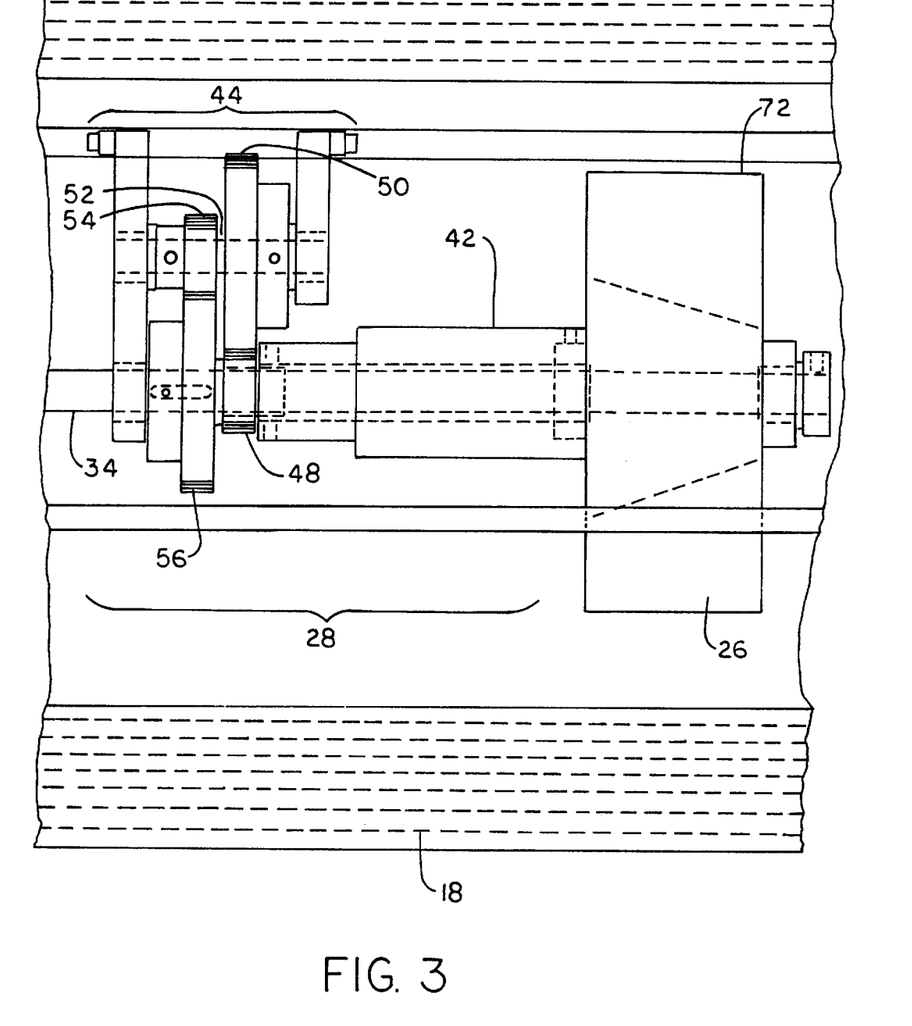
FIG. 3 is a cut-away view showing the drive linkage and the turbine.

In one embodiment of the invention, as shown in FIG. 3, the linkage 28 is comprised of a turbine shaft 34 positioned within the filter 18 and connected to the turbine 26. A drive cover 36 is attached to an end 38 of the filter 18 opposite the flow end 20 and a drive plate 40 connects the shaft 34 to the drive cover 36. In a specific version of such embodiment, a coupling 42 extends from a turbine 26 and a gear train 44 is connected intermediate the coupling 42 and the turbine shaft 34. In a more specific version of the embodiment, reduction gearing 46 is used to facilitate rotation of the shaft 34. Such reduction gearing 46 can include a first spur gear 48 attached to the coupling 42, a second spur gear 50 interacting with the first spur gear 48, a jack shaft 52 connecting the second spur gear 50 to a third spur gear 54 and a fourth spur gear 56 connected to the turbine shaft 34 and interacting with the third spur gear 54.

Figure 4:
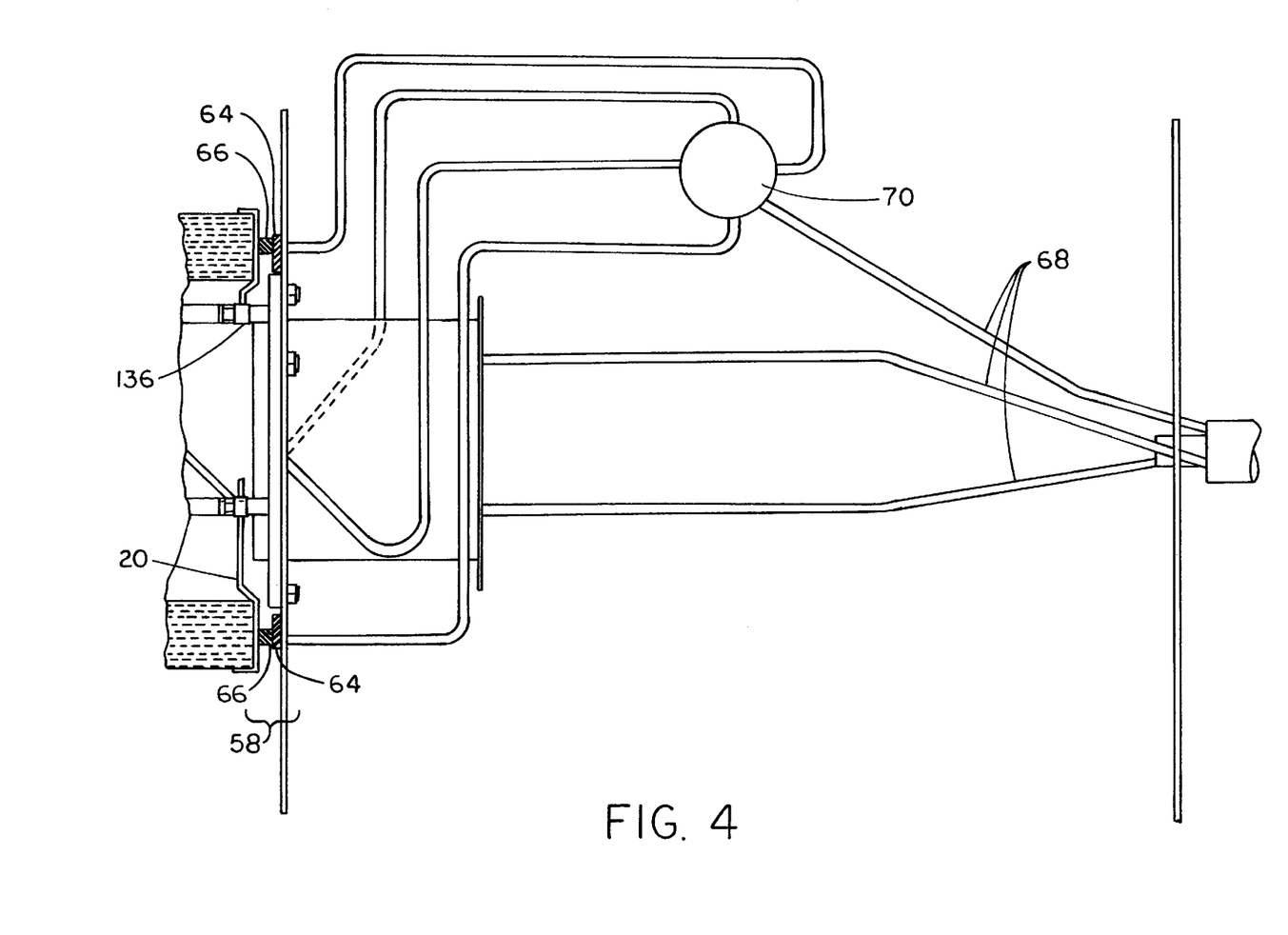
FIG. 4 is a side view showing the air nozzle and the auxiliary air lines.

FIGS. 2 and 4 show another embodiment of the invention in which a plurality of air bearings 58 connect the end 20 of the filter 18 accommodating flow to a wall of cage plate 60. Each of the air bearings 58 is comprised of an air-bearing port 62 on the side of the wall 60 outside of the dirty-air chamber 16, a slotted ring 64 (FIG. 5) between the wall 60 and the filter 10 and a sealing element 66 attached to the first end 20 of the filter 18. In a specific version of this embodiment, as shown in FIGS. 2 and 4, a plurality of auxiliary air lines 68 are positioned around the nozzle 22 and at least one of the auxiliary air lines 68 is routed to a manifold 70 which then directs the air to the air-bearing ports 62. In another version of this embodiment, the remaining auxiliary air lines 68 are oriented so as to direct air flow toward the outer edge 72 of the turbine 26.

In still another embodiment of the invention, the filter 18 is positioned on a support frame 74 located within the housing 12.

During operation, the filter 18 is rotated during the activation of the pulsed air cleaning valve 24. During the brief activation of the air valve 24, compressed air travels through the air valve 24, into the nozzle 22 and into a plurality of smaller auxiliary air lines 68. The majority of air travels through the nozzle 22 thereby causing a turbine 26 inside the filter 18 to rotate along with its connected gear train 44 and drive end cover 36.

Along with the air traveling through the turbine 26, compressed air travels through the auxiliary air lines 68. A plurality of the auxiliary lines 68 are directed to an optimum location for maximizing the amount of rotation and torque of the turbine 26. At least one of the auxiliary air lines 68 sends air to a manifold 70 which distributes the air equally into multiple equally spaced air bearing ports 58 that are arranged on the clean air side of the wall or cage plate 60.

Figure 5:
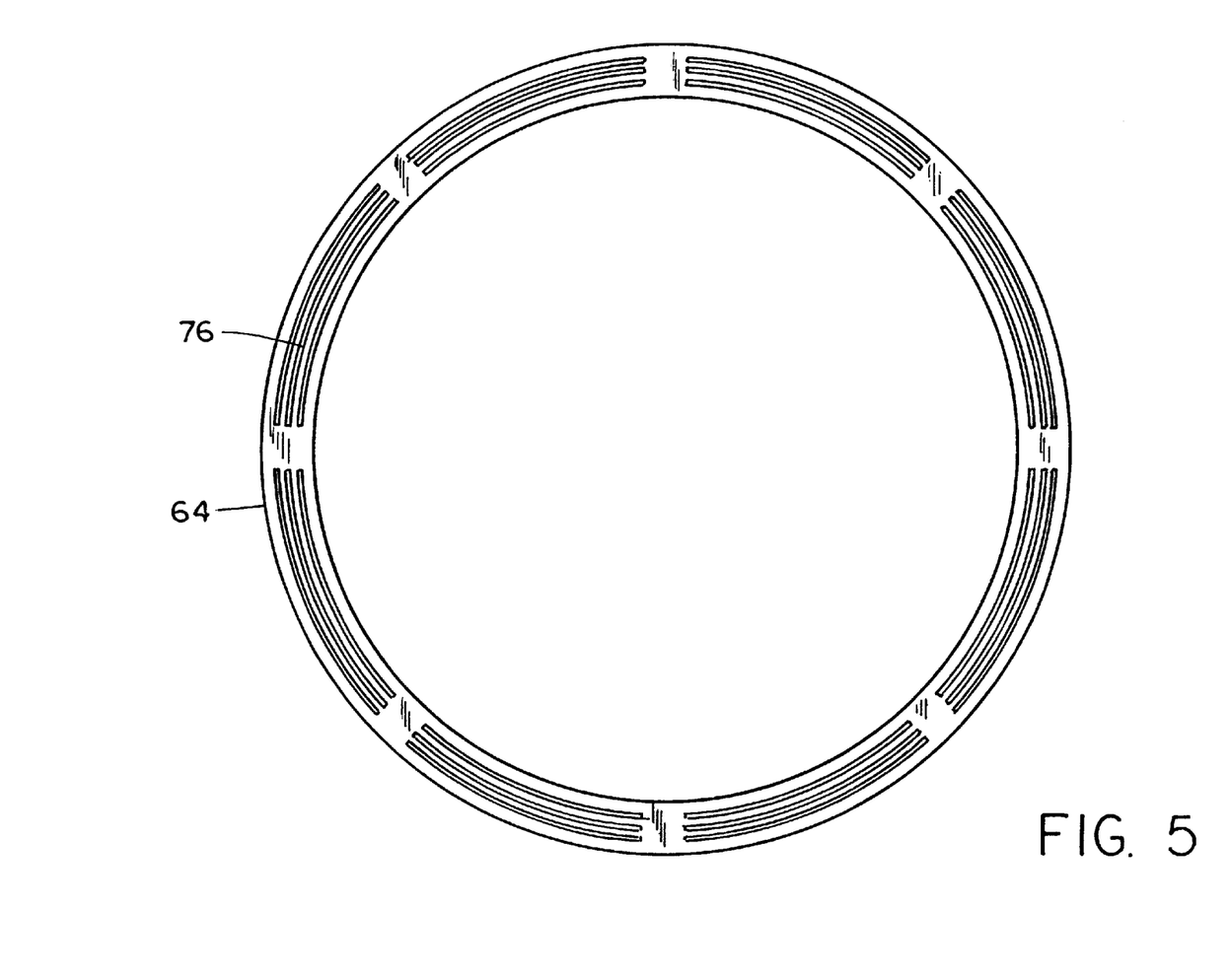
FIG. 5 is a top view of the slotted ring that is included with the air bearing.

The air bearings 58 are generated between the seal 66 attached to the end 20 of the filter 18 and the slotted ring 64 that is welded onto the dirty side of the cage plate 60. An air bearing 58 is created from the compressed air in the auxiliary line 68 that flows through the ports 62 and into the open area 76 of the slotted ring 64, thus pushing against the rubber seal 66 on the horizontal filter 18. As the air pressure increases inside the slots 64, the rubber seal 66 is pushed away from the slotted ring 64 and momentarily floats, thereby allowing the filter 18 to turn.

Sufficient compressed air is supplied by the auxiliary line 68 to allow for both leakage around the seal 66 and momentary floating. Because the compressed air is at a higher pressure than the air inside the collector, which is generated by the collector fan (not shown), no dirty air from the collector 10 leaks past the rubber seal 66 into the clean-air chamber 14 during the floating of the rubber seal 66 when the pulsed cleaning air valve 24 is activated.

Figure 6:
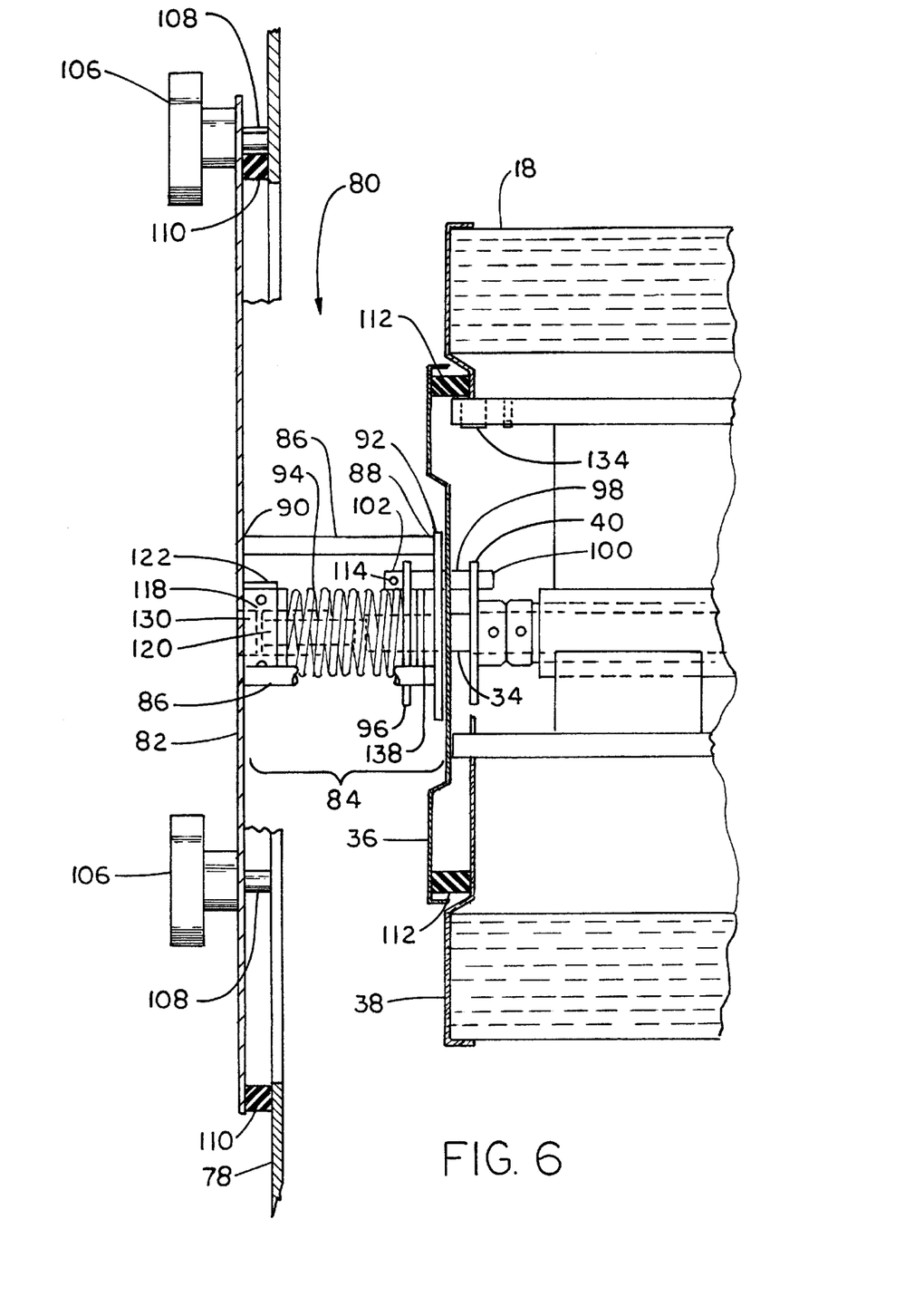
FIG. 6 is a sectional view of the door assembly.

FIG. 6 shows a preferred embodiment of the invention wherein the housing 12 of the dust collector 10 includes a door wall 78 defining a passageway 80. An outer door 82 is engaged with the door wall 78 to substantially seal the passageway 80 and a spring assembly 84 connects the door 82 to the drive cover 36. In such embodiment, the spring assembly 84 includes a first set of guide pins 86 having proximal and distal ends 88, 99. The proximal ends 88 of the pins 86 are attached to a stop plate 92 while the distal ends 90 are connected to the door 82 thereby establishing a fixed distance between the door 82 and the stop plate 92. A compression spring 94 is positioned between the door 82 and a spring back plate 96 within the first set of guide pins 86. A second set of guide pins 98 are attached to the drive cover 36 and extend through the stop plate 92 and the spring backing plate 96 into the dirty-air chamber 16. Such guide pins 98 have proximal and distal ends 100, 102 with a retainer (not shown) at the distal end 102 and at least one of the pins 98 extending through the drive cover 36 and being affixed at its proximal end 100 to the drive plate 36, whereby torque is transferred from the turbine shaft 34 and the drive plate 40 to the drive cover 36 thereby causing both the drive plate 40 and the drive cover 36 to rotate. Furthermore, as a result of their positioning, the distal and proximal ends 100, 102 of guide pins 98 guide the compression spring 94 thereby keeping such spring 94 positioned around the center of the drive shaft 34.

The door assembly is designed to achieve the following conditions: (1) seal the dirty air from entering the inside of the filter; (2) seal the dirty air inside the dirty-air chamber 16 of the collector 10 and prevent the dirty air from escaping to the outside of the collector 10; (3) permit the rotation of the filter 18 during the activation of the cleaning air valve 24; and (4) support the end 38 of the filter assembly 18 in the correct location.

In a specific version of the preferred embodiment, the door assembly consists of a large outer door 82 that is fixed and located on the outside wall 78 of the collector 10 by a plurality of equally spaced knobs 106 that are screwed into studs 108 that extend from the outside of the end wall 78 of the collector 10. Furthermore, a seal 110 is attached to the inside perimeter surface of the outer door 82 so that when the outer door 82 is positioned onto the collector 10, the seal 110 forms a barrier between the outer door 82 and the end wall 78 of the collector 10. This combination keeps the dirty air inside the collector 10 from escaping to the outside of the collector 10.

The drive cover 36 which is attached to the end 38 of the filter 18 also forms part of the door assembly. A seal 112 attached to the inside perimeter of the drive cover 36 forms a barrier between the dirty air inside the dirty-air chamber 16 and the clean filtered air inside the core of the filter 18.

The first set of guide pins 86 are located between the door 82 and the stop plate 92. These pins 86, which are attached so as to extend into the space of the dirty-air chamber 16, are positioned around the compression spring 94, multiple rubber washers, steel washers 138 and the compression spring backing plate 96. These washers 138 form a seal around the turbine drive shaft 34 when the spring 94 is compressed thereby preventing dirty air from entering the clean-air portion of the filter 18. The second set of guide pins 98 are positioned within the first set of guide pins 86. Each of the second set of guide pins 86 has a hole 114 located adjacent to the front surface of the compression spring backing plate 96 to allow for the threading of a wire retainer (not shown). This retainer keeps the outer door 82, compression spring 96, thrust bearing 118, drive cover 36 and other components together as a door assembly when one needs to remove the door assembly from the collector 10.

When in operation, a thrust bearing 118 attached to the dirty air side of the door 82 is used to align the door 82 with the center axial support 120 that extends from the center of the filter 18. In a preferred embodiment, the thrust bearing 118 is protected by a filter wrap 122. The compression spring 94 in the door assembly is compressed when the outer door 82 and seal 110 are pushed tightly against the outer end wall 78 of the dust collector 10. This compressed spring 94 causes a thrust force that is transferred to the front surface of the drive cover 36 and into the seal 112 that is mounted in the perimeter of the drive cover 36. This thrust force generates a frictional force between the seal 112 in the perimeter of the drive cover 36 and the end of the filter 18.

Upon actuation of the cleaning air valve 24, compressed air flows through the turbine drive arrangement thereby generating enough torque to rotate the filter 18 while the compression spring 94 provides the thrust force which generates a friction force that transfers the torque from the drive cover seal 112 to the end of the filter 18.

Another purpose of the compression spring 94 is to provide a thrust force that maintains a seal between the dusty air in the dirty-air chamber 16 and the filtered clean air inside the core of the filter 18. As discussed above, the compression spring 94 applies a thrust force to the surface of the drive cover 36 and into the seal 112 that is mounted to the perimeter of the cover 36. This results in a barrier being formed between the compressed seal 112 on the drive cover 36 and the end of the filter 18.

In the preferred embodiment of the invention as shown in FIG. 2, at least two non-vertical filters 18(a), 18(b) are positioned within the housing 12. These filters 18(a), 18(b) are oriented end-to-end and a sealing element 124 seals the two filters 18(a), 18(b) together. In such an embodiment, the first filter 18(a) is inserted onto the cartridge cage structure 74 and is positioned against the slotted ring 64 that is attached to the wall or cage plate 60 that separates the dirty-air chamber 16 from the clean-air chamber 14. The second filter 18(b) is also inserted onto the cartridge cage support 74 and against the first filter 18(a). The drive cover 36 is attached to the end 38 of the second filter 18(b) opposite the first filter 18(a) in such a manner that at least one of the three equally spaced pins 98 attached to the drive cover 36 extends into the clean air space of the inner core of the second horizontal filter 18(b).

Such pin 98 extends through the drive plate 40 and transfers the torque of the turbine shaft 34 and the drive plate 40 into the drive cover 36 where it is then transferred into the seal 112 that is mounted to the perimeter of the drive cover 36. This seal 112 forms a frictional surface against the drive cover 36 that allows the turbine torque to be applied to the second filter 18(b) thereby causing the rotation of both filters 18(a), 18(b).

When two filters are used, the compression spring 94 provides a thrust force that maintains a seal between the dusty air in the dirty-air chamber 16 and the filtered clean air inside the core of the second horizontal filter 18(b). As discussed above, the compression spring 94 applies a thrust force to the surface of the drive cover 36 and into the seal 112 that is mounted to the perimeter of the cover 36. This thrust force results in a barrier being formed between the compressed seal 112 on the drive cover 36 and the end of the second filter 18(b). In such an arrangement, a second seal 124 is positioned at the end of the second filter 18(b) that is opposite the drive cover 36 so as to form a barrier between the second and first filters 18(a), 18(b). Furthermore, a third seal 66 located on the end of the first filter 18(a) closes to the cage plate 60 forms a barrier between the first filter 18(a) and the slotted ring 64 that is attached to the dirty side of the cage plate 60. This arrangement ensures that a seal is always maintained between the dirty air in the dirty-air chamber 16 and the clean, filtered air inside the filters 18(a), 18(b).

Because the compression spring 94 applies an equal thrust force in both the forward and backward axial directions, the door assembly includes a thrust bearing 118, as shown in FIG. 6, that receives the backward direction of the thrust force. Positioned in the center of the inside surface of the outer large door 82 is a short shaft 130 that is used to locate the thrust bearing 118. On the side of the thrust bearing 118 opposite the door 82, a center-axle support piece 120 is inserted a short distance into the thrust bearing 118. Furthermore, a flanged collar of the center-axle support 120 contacts the face of the thrust bearing 118 on one side while the other side of the flanged collar face contacts the compression spring 94.

The center-axle support 120 also extends through compression spring 94 wherein it positions the spring 94 and allows for rotation of the turbine shaft 34. A concentric hole is provided in the middle of the center-axle support 120 for locating and supporting the turbine-drive shaft 34. Finally, a portion of the distance through the concentric hole is threaded for providing an alignment tool for pre-centering the drive cover 36 with the drive plate 40.

In a preferred embodiment, the torque required to rotate the filter 18 can be increased by connecting the turbine 26 to a gear train 44. This gear train 44 multiplies the torque that is generated by the compressed air passing through the turbine blades. In such an embodiment, the turbine 26 rotates on bushings that are located concentrically on the turbine shaft 34. A coupling 42 connects one end of the turbine hub to the hub of the first spur gear 48. Such hubs are concentric with the turbine shaft 34. In addition to the hub, the first spur gear 48 also rotates on a bushing that is concentric with the turbine shaft 34. This allows the turbine shaft 34 to provide the guidance for both the rotating turbine 26 and the first spur gear 48.

The first spur gear 48 drives a second larger diameter spur gear 50 positioned on a short jack shaft 52 thereby transferring torque from the spur gear 50 to the short jack shaft 52. A third short spur gear 54 transfers its torque to a fourth larger diameter spur gear 56 which is attached to the turbine drive shaft 34. The turbine drive shaft 34 is concentric with the outside diameter of the filters 18(a), 18(b) and is supported by the cartridge cage structure 74. In one version of this embodiment, a center bar located within the cartridge cage structure 74 has a concentric hole with bushings spaced so as to provide adequate guidance for the turbine shaft 34.

At the door end of the cartridge cage structure 74 and adjacent to the end face of the center bar, the drive plate 40 is attached to the turbine shaft 34 in such a manner that the plate 40 receives its torque from the shaft 34. As discussed earlier, the torque is passed through the pin 98 and the seal 112 that are attached to the drive cover 36.

To reduce the torque required to rotate the filters 18(a), 18(b), cam followers 134 or track rollers are mounted onto the top support rod of the cartridge cage structure 74. The end covers of the filters 18(a), 18(b) have an internal concentric opening which allows the non-vertical filters 18(a), 18(b) to mount on the cartridge cage structure 74 thereby allowing the cage structure 74 to support the weight of the filters 18(a), 18(b) on the rollers 134. Each front and back cover of the non-vertical filter 18 has a roller 134 for ease of rotation. When a plurality of filters 18(a), 18(b) are used, the first cover of the first filter 18(a) has a second roller 136 which provides additional guidance during the floating of the filter 18(a) which occurs next to the slotted ring 64 on the dirty side of the cage plate 60.

The invention also involves a method for cleaning a filter 18 located in a dust collector 10. Such method is comprised of the steps of: (a) positioning a turbine 26 within the filter 18; (b) linking the turbine 26 to the filter 18; (c) impacting the turbine 26 with a blast of air thereby causing the turbine 26 to rotate; and (d) imparting the rotation of the turbine 26 to the filter 18 by means of the linkage 28, whereby the rotation causes the particulate accumulated on the filter 18 to fall into the collector 10.

In one preferred embodiment of the method, the blast of air is generated through a nozzle 22. In a more specific version of such embodiment, the air blast is generated through a nozzle 22 in combination with a plurality of air lines 68.

While the principles of the invention have been shown and described in connection with but a few embodiments, it is to be understood clearly that such embodiments are by way of example and not limiting. Various modes of carrying out the invention are contemplated as being within the scope of the following claims particularly pointing out and distinctly claiming the subject matter which is regarded as the invention.

I claim:

1. In a dust collector for removing particulate from air, the dust collector including a housing enclosing clean-air and dirty-air chambers, an elongate non-vertical annular hollow filter in the housing with an end accommodating flow of clean air, and a nozzle connected to an air source for injecting a blast of air into the end to dislodge particulate from the filter, the improvement comprising:

a turbine positioned within the filter; and linkage joining the turbine with respect to the filter such that a blast of air from the nozzle turns the turbine and thereby turns the filter, whereby the filter is reoriented to facilitate removal of particulate collected thereon.

2. The improvement of claim 1 wherein the linkage is comprised of:

a turbine shaft positioned within the filter and connected to the turbine;

a drive cover attached to an end of the filter opposite the flow end; and a drive plate connecting the shaft to the drive cover.

3. The improvement of claim 2 wherein:

a coupling extends from a turbine; and a gear train is connected intermediate the coupling and the turbine shaft.

4. The improvement of claim 3 wherein the gear train is comprised of:

a first spur gear attached to the coupling;

a second spur gear interacting with the first spur gear;

a secondary shaft connecting the second spur gear to a third spur gear; and a fourth spur gear connected to the turbine shaft and interacting with the third spur gear.

5. The improvement of claim 1 wherein a plurality of air bearings connects the end of the filter accommodating flow to a wall, each air bearing comprising;

an air-bearing port on the side of the wall outside of the dirty-air chamber;

a slotted ring between the wall and the filter; and a sealing element attached to the flow end of the filter.

6. The improvement of claim 5 wherein:

a plurality of auxiliary air lines are connected to the air source;

at least one auxiliary air line is routed to a manifold; and the manifold directs the air to the air-bearing ports.

7. The improvement of claim 6 wherein the remaining auxiliary air lines are oriented so as to direct air flow toward the outer edge of the turbine.

8. The improvement of claim 1 wherein the filter is positioned on a support frame located within the housing.

9. The improvement of claim 2 wherein the housing of the dust collector includes a door wall defining a passageway, an outer door engaged with the door wall to substantially seal the passageway and a spring assembly connecting the door to the drive cover, the spring assembly including:

a first set of guide pins having proximal and distal ends where the proximal ends are attached to a stop plate and the distal ends are connected to the door;

a compression spring positioned between the door and a spring backing plate within the first set of guide pins;

a second set of guide pins attached to the drive cover and extending through the stop plate and the spring backing plate into the dirty-air chamber, the guide pins having proximal and distal ends with a retainer at the distal end and at least one of the pins extending through the drive cover and being affixed at its proximal end to the drive plate, whereby torque is transferred from the turbine shaft and the drive plate to the drive cover.

10. The improvement of claim 1 wherein:

at least two filters are positioned in the housing;

the filters are oriented end-to-end; and a sealing element seals the two filters together.

11. The improvement of claim 10 wherein:

a plurality of auxiliary air lines are connected to the air source;

at least one auxiliary air line is routed to a manifold; and the manifold directs the air to the air-bearing ports.

12. In a dust collector for removing particulate from air, the dust collector including a housing enclosing clean-air and dirty-air chambers, an elongate non-vertical annular hollow filter in the housing with an end accommodating flow of clean air, and a nozzle connected to an air source for injecting a blast of air into the end to dislodge particulate from the filter, the improvement comprising a means for turning the filter whereby the filter is reoriented to facilitate removal of particulate collected thereon.

13. A method for cleaning a filter located in a dust collector comprising the steps of:

positioning a turbine within the filter;

linking the turbine to the filter;

impacting the turbine with a blast of air thereby causing the turbine to rotate; and imparting the rotation of the turbine to the filter by means of the linkage, whereby the rotation causes the particulate accumulated on the filter to fall off in the collector.

14. The method of claim 13 wherein the blast of air is generated through a nozzle.

15. The method of claim 14 wherein the blast of air is generated through a nozzle in combination with a plurality of air lines.

* * * * *

UNITED STATES PATENT AND TRADEMARK OFFICE
CERTIFICATE OF CORRECTION

PATENT NO.   : 6,368,390 B1  
DATED        : April 9, 2002  
INVENTOR(S)  : Glenn W. Bitner and Timothy J. Yurczak

It is certified that error appears in the above-identified patent and that said Letters Patent is hereby corrected as shown below:

<u>Title page,</u>
Item [75], Inventors, delete "Jolier" and insert -- Joliet --.

Signed and Sealed this

Sixteenth Day of July, 2002

Attest:

Attesting Officer

JAMES E. ROGAN
*Director of the United States Patent and Trademark Office*